(12) United States Patent
Koh (10) Patent No.: US 11,189,878 B2
(45) Date of Patent: Nov. 30, 2021

(54) BATTERY PACK

(71) Applicant: Samsung SDI Co., Ltd., Yongin-si (KR)

(72) Inventor: Seok Koh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 404 days.

(21) Appl. No.: 16/085,535

(22) PCT Filed: Apr. 10, 2017

(86) PCT No.: PCT/KR2017/003859
§ 371 (c)(1),
(2) Date: Sep. 14, 2018

(87) PCT Pub. No.: WO2017/179865
PCT Pub. Date: Oct. 19, 2017

(65) Prior Publication Data
US 2020/0303694 A1   Sep. 24, 2020

(30) Foreign Application Priority Data

Apr. 14, 2016 (KR) .................. 10-2016-0045552

(51) Int. Cl.
*H01M 14/00* (2006.01)
*H01M 50/209* (2021.01)
(Continued)

(52) U.S. Cl.
CPC ..... *H01M 50/209* (2021.01); *H01M 10/0436* (2013.01); *H01M 10/425* (2013.01);
(Continued)

(58) Field of Classification Search
CPC .............. H01M 2/1061; H01M 2/204; H01M 10/0436; H01M 10/425; H01M 2010/4271; H01M 2220/30
See application file for complete search history.

(56) References Cited

U.S. PATENT DOCUMENTS 5,853,915 A    12/1998  Suto
6,317,248 B1*  11/2001  Agrawal .................. G02F 1/155
                                                  340/438
(Continued)

FOREIGN PATENT DOCUMENTS

CN      2877039 Y    3/2007
CN    104835979 A    8/2015
(Continued)

OTHER PUBLICATIONS

Extended European Search Report for corresponding European Patent Application No. 17782620.3, dated Sep. 3, 2019, 7 pages.
(Continued)

*Primary Examiner* — Jane J Rhee
(74) *Attorney, Agent, or Firm* — Lewis Roca Rothgerber Christie LLP (57) ABSTRACT

A battery pack according to an exemplary embodiment of the present invention includes: multiple unit batteries which are positioned in parallel in a first direction; and a pair of connecting members which is attached to both sides of the multiple unit batteries and electrically and physically connects the multiple unit batteries in the first direction. Each of the pair of connecting members includes: multiple battery fixing portions which are attached to the multiple unit batteries, respectively; and at least one deformable portion which is positioned between the multiple battery fixing portions such that at least a part of the deformable portion is
(Continued)

in a non-contact state with the multiple unit batteries and the deformable portion is bent by external force.

22 Claims, 11 Drawing Sheets

(51) Int. Cl.
  *H01M 10/04* (2006.01)
  *H01M 10/42* (2006.01)
  *H01M 50/502* (2021.01)

(52) U.S. Cl.
  CPC .. *H01M 50/502* (2021.01); *H01M 2010/4271* (2013.01); *H01M 2220/30* (2013.01)

(56) References Cited

U.S. PATENT DOCUMENTS

| | | | |
|---|---|---|---|
| 2011/0117408 A1* | 5/2011 | Lennox | H01M 50/116 429/99 |
| 2011/0248676 A1 | 10/2011 | Kim | |
| 2012/0189900 A1 | 7/2012 | Park et al. | |
| 2013/0207612 A1* | 8/2013 | Lev | H02J 7/0036 320/134 |
| 2015/0228954 A1 | 8/2015 | Wang et al. | |
| 2016/0043444 A1* | 2/2016 | Kim | H01M 2/024 429/61 |
| 2016/0093838 A1 | 3/2016 | Kwon et al. | |

FOREIGN PATENT DOCUMENTS

| | | | | |
|---|---|---|---|---|
| JP | 55-122372 A | | 9/1980 | |
| JP | 63121246 A | * | 5/1988 | ............. H01M 2/30 |
| JP | S63121246 A | | 5/1988 | |
| KR | 10-2007-0043496 A | | 4/2007 | |
| KR | 10-1137376 B1 | | 4/2012 | |
| KR | 10-2012-0085487 A | | 8/2012 | |
| KR | 10-2015-0134646 A | | 12/2015 | |
| KR | 10-2016-0017981 A | | 2/2016 | |
| KR | 10-2016-0036282 A | | 4/2016 | |
| WO | WO 2011/082722 A1 | | 7/2011 | |

OTHER PUBLICATIONS

Chinese Office action dated Nov. 26, 2020 issued in corresponding CN Application No. 201780021962.7, with English translation, 16 pages.

Chinese Office Action dated Oct. 11, 2021, issued in corresponding Chinese Patent Application No. 201780021962.7 (11 pages).

* cited by examiner

BATTERY PACK

CROSS-REFERENCE TO RELATED APPLICATION(S)

This application is a National Phase Patent Application of International Patent Application Number PCT/KR2017/003859, filed on Apr. 10, 2017, which claims priority of Korean Patent Application No. 10-2016-0045552, filed Apr. 14, 2016. The entire contents of both of which are incorporated herein by reference.

TECHNICAL FIELD

The present invention relates to a battery pack, and more particularly, to a battery pack including a connection structure that connects multiple unit batteries.

BACKGROUND ART

Portable electronic devices, such as smartphones, tablet PCs, and smart watches, are being increasingly used by virtue of development of communication technologies and wireless Internet. The portable electronic device uses a secondary battery, which may be charged or discharged, as a power source, and high outputs may be provided when a battery pack made by combining multiple secondary batteries is used as a power source for the portable electronic device.

Recently, the portable electronic device is being developed toward a flexible portable electronic device such as a bendable or foldable portable electronic device instead of the existing non-flexible portable electronic device.

DISCLOSURE

Technical Problem

The present invention has been made in an effort to provide a battery pack that may be applied to a flexible portable electronic device such as a bendable or foldable portable electronic device.

Technical Solution

An exemplary embodiment of the present invention provides a battery pack including: multiple unit batteries which are positioned in parallel in a first direction; and a pair of connecting members which is attached to both sides of the multiple unit batteries and electrically and physically connects the multiple unit batteries in the first direction. Each of the pair of connecting members includes: multiple battery fixing portions which are attached to the multiple unit batteries, respectively; and at least one deformable portion which is positioned between the multiple battery fixing portions such that at least a part of the deformable portion is in a non-contact state with the multiple unit batteries and the deformable portion is bent by external force.

Each of the pair of connecting members may include a metal wire, and first and second insulating films which surround the metal wire, and the pair of connecting members may have flexibility. The metal wire and the first and second insulating films may extend with a predetermined width in a longitudinal direction of the pair of connecting members.

An opening may be formed in any one of the first and second insulating films of each of the multiple battery fixing portions to expose a part of the metal wire, and the exposed part of the metal wire may be electrically connected to the unit battery and fixed to the unit battery. An anisotropic conductive film may be positioned between the exposed part of the metal wire and the unit battery.

Each of the multiple unit batteries may include an upper surface, a lower surface, and multiple side surfaces. The upper surfaces of the multiple unit batteries may be positioned at the same side, the lower surfaces of the multiple unit batteries may be positioned at the same side, and the side surfaces of the multiple unit batteries may be arranged adjacent to one another.

The multiple battery fixing portions may be in contact with the upper surfaces or the lower surfaces of the multiple unit batteries, and the at least one deformable portion may be bent from the multiple battery fixing portions and may be in contact with the side surfaces of the multiple unit batteries.

The multiple side surfaces may include first side surfaces which are flat, and second side surfaces which have curvatures, and the second side surfaces of the multiple unit batteries may be arranged adjacent to one another. The at least one deformable portion may include a spacing portion spaced apart from the second side surfaces.

Each of the pair of connecting members may include a terminal portion which is connected to one side of any one of the multiple battery fixing portions and bent from the battery fixing portion, and the terminal portion may be electrically connected to a protective circuit module.

Another exemplary embodiment of the present invention provides a battery pack including: multiple unit batteries, a first connecting member, and a second connecting member. The multiple unit batteries are arranged in a first direction so that side surfaces of the multiple unit batteries are adjacent to one another, and the multiple unit batteries include electrode terminals formed on upper portions of the multiple unit batteries, and casing bottoms formed on lower portions of the multiple unit batteries. The first connecting member includes multiple first battery fixing portions that are fixed to the upper portions of the multiple unit batteries and electrically connected to the electrode terminals. The second connecting member includes multiple second battery fixing portions that are fixed to the lower portions of the multiple unit batteries and electrically connected to the casing bottoms. The first and second connecting members include first and second deformable portions, respectively. The first and second deformable portions are bent from the multiple first and second battery fixing portions, respectively, and are in contact with the side surfaces of the multiple unit batteries, and at least a part of the first deformable portion and at least a part of the second deformable portion are in a non-contact state with the multiple unit batteries. An angle between the multiple unit batteries is changed as the first and second deformable portions are bent.

Each of the multiple unit batteries may include two first side surfaces which are flat, and two second side surfaces which have curvatures, and the second side surfaces of the multiple unit batteries may be arranged adjacent to one another.

The first and second deformable portions may include contact portions which are connected to the first and second battery fixing portions, respectively, and are in contact with the first side surface, and spacing portions which are spaced apart from the second side surface and bent.

Each of the first and second connecting members may include a metal wire, and first and second insulating films which surround the metal wire. An opening may be formed in any one of the first and second insulating films of each of the multiple first and second battery fixing portions to expose a part of the metal wire, and the exposed part of the metal wire may be electrically connected to the electrode terminal or the casing bottom by an anisotropic conductive film.

The first and second connecting members may further include first and second terminal portions, respectively, which are connected to one side of any one of the multiple first and second battery fixing portions and are in parallel with the side surface of any one of the multiple unit batteries.

The battery pack may further include a support body which is positioned between the side surface of any one of the unit batteries and the first and second terminal portions. The support body may have a first concave groove which is formed at an inner side directed toward the side surface of any one of the unit batteries, and a second concave groove which is formed at an outer side and has a rectangular shape, and the first and second terminal portions may be accommodated in the second concave groove.

The battery pack may further include a protective circuit module which are positioned outside the first and second terminal portions and electrically connected to the first and second terminal portions. An opening may be formed in any one of the first and second insulating films of each of the first and second terminal portions to expose a part of the metal wire, and the exposed part of the metal wire may be electrically connected to the protective circuit module by an anisotropic conductive film.

The battery pack may further include first adhesive tapes which fix the first and second connecting members to the multiple unit batteries; and a second adhesive tape which fixes the protective circuit module to any one of the unit batteries.

Advantageous Effects

According to a battery pack according to the exemplary embodiment of the present invention, the multiple unit batteries are electrically and physically connected to one another by using the first and second connecting members made of a flexible material. In this case, the battery pack may be deformed in various forms as an angle between the unit batteries is changed by bending the deformable portion or as the unit batteries face each other. The battery pack according to the exemplary embodiment of the present invention may be applied to a flexible electronic device such as a bendable or foldable electronic device.

MODE FOR INVENTION

Hereinafter, exemplary embodiments of the present invention will be described in detail with reference to the accompanying drawings so that those skilled in the technical field to which the present invention pertains may easily carry out the exemplary embodiments. The present invention may be implemented in various different ways, and is not limited to the exemplary embodiments described herein.

The drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Figure 1:
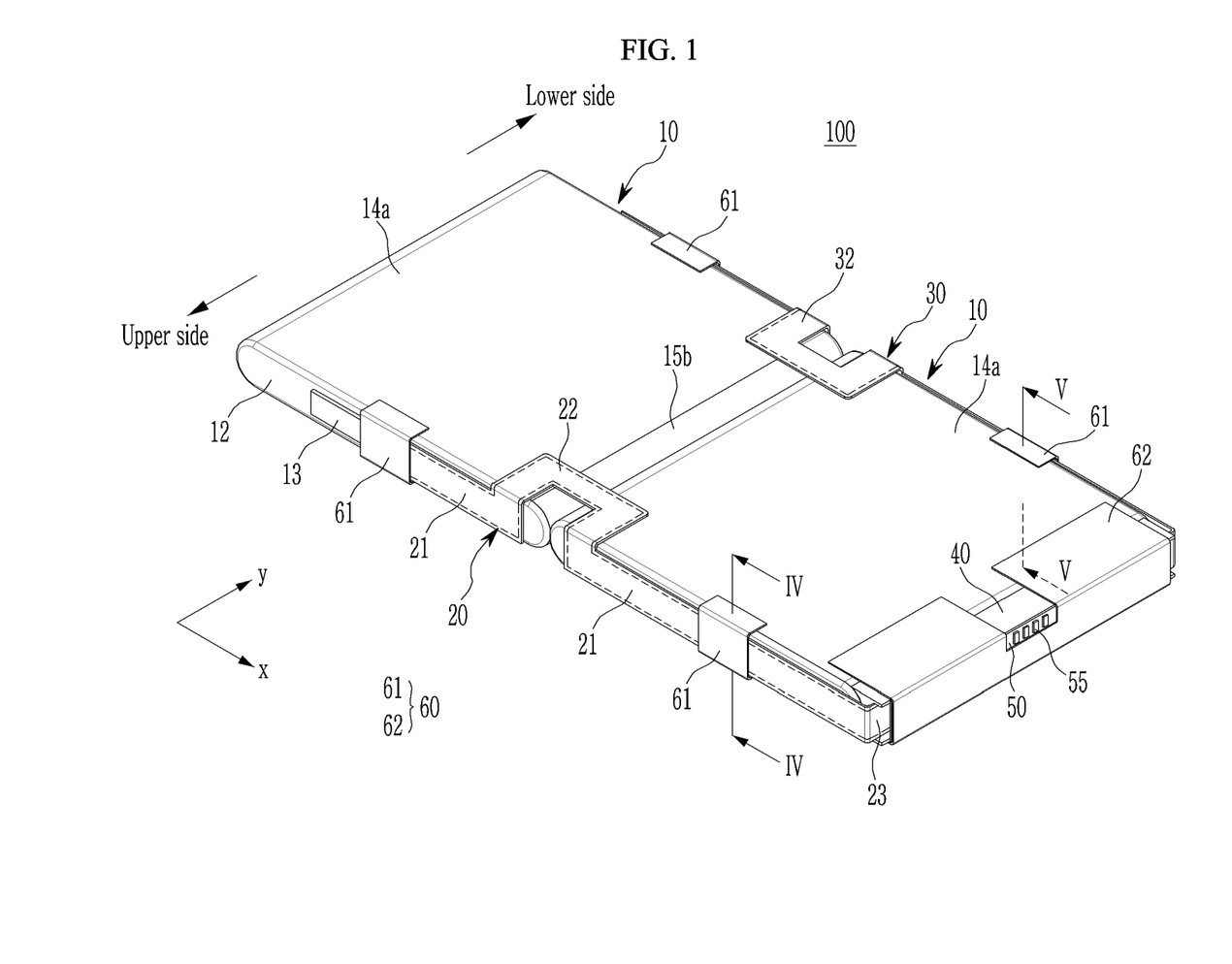
FIG. 1 is a perspective view of a battery pack according to an exemplary embodiment of the present invention.
Figure 2:
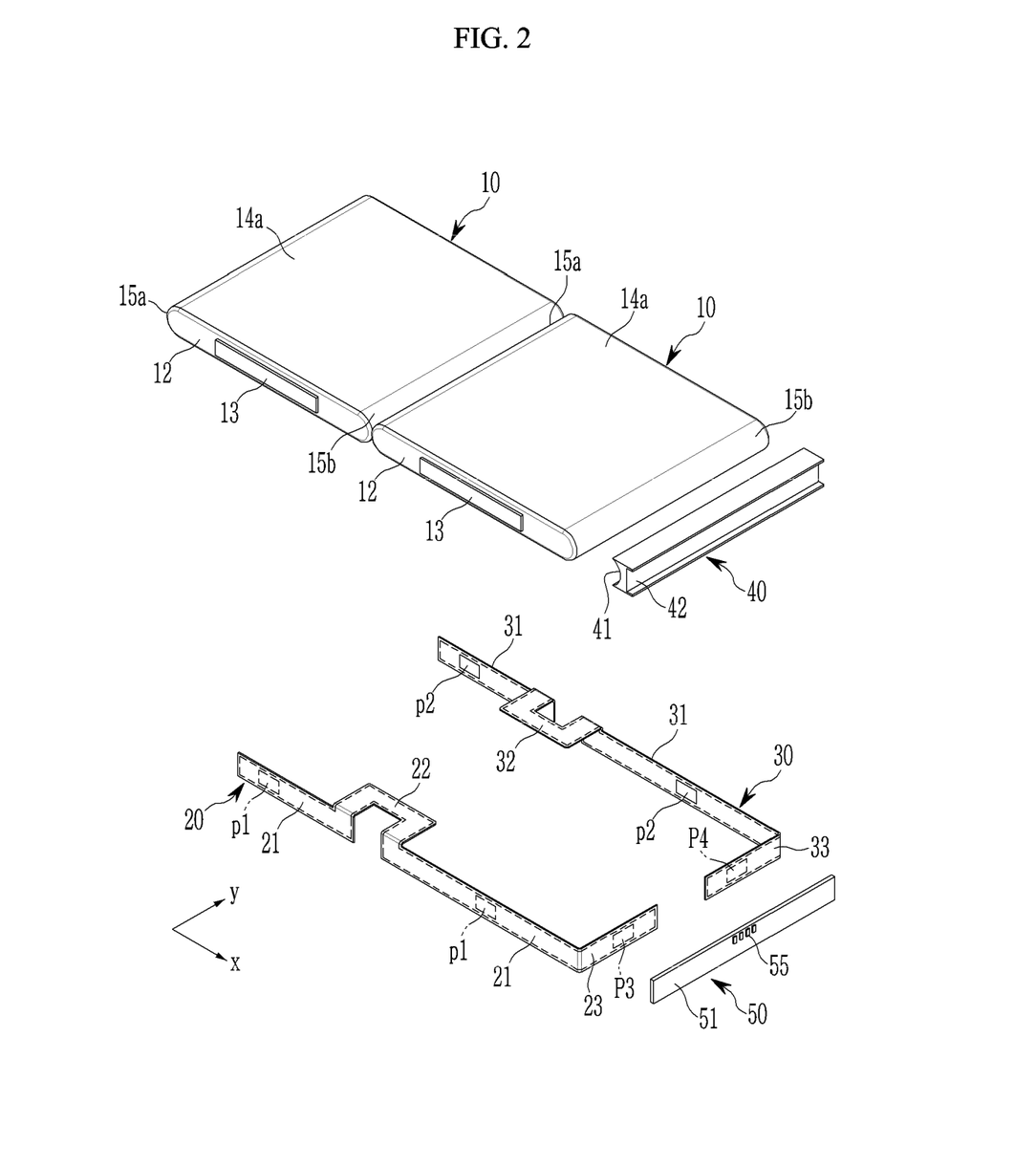
FIG. 2 is an exploded perspective view of the battery pack illustrated in FIG. 1.

FIG. 1 is a perspective view of a battery pack according to an exemplary embodiment of the present invention, and FIG. 2 is an exploded perspective view of the battery pack illustrated in FIG. 1.

Referring to FIGS. 1 and 2, a battery pack 100 includes multiple unit batteries 10 which are positioned in parallel in a first direction (x direction), and a pair of connecting members 20 and 30 which electrically and physically connects the multiple unit batteries 10 in the first direction (x direction). In addition, the battery pack 100 may further include a support body 40, a protective circuit module (PCM) 50, and adhesive tapes 60.

The unit battery 10 may be an angular battery or a pouch type battery. The angular battery will be exemplified in the following description, but the unit battery 10 is not limited to the angular battery.

The unit battery 10 includes a casing 11 which has an opening at one side thereof, an electrode assembly (not illustrated) which is accommodated in the casing 11 through the opening, a cap plate 12 which closes the opening of the casing 11, and an electrode terminal 13 which protrudes upward from the cap plate 12 while penetrating the cap plate 12. The unit battery 10 is a rechargeable secondary battery, and may be a lithium-ion battery.

The casing 11 has an approximately hexahedral shape opened at one side thereof, and the casing 11 is made of a metallic material to ensure strength. For example, the casing 11 may be made of aluminum or an aluminum alloy. After the electrode assembly is inserted into the casing 11 through the opening, the opening is sealed by the cap plate 12. The cap plate 12 may be made of the same material as the casing 11, and the cap plate 12 may be fixed to the casing 11 by laser welding.

The electrode assembly includes a first electrode plate and a second electrode plate, and a separator disposed between the first and second electrode plates. One of the first and second electrode plates is a positive electrode plate, and the other is a negative electrode plate. The electrode assembly may be manufactured by a method of sequentially stacking the first electrode plate, the separator, and the second electrode plate and then rolling the first electrode plate, the separator, and the second electrode plate into a jelly roll shape.

The electrode terminal 13 is insulated from the cap plate 12 by an insulating member such as a gasket. The first electrode plate of the electrode assembly is electrically connected to the casing 11 and the cap plate 12, and the second electrode plate is electrically connected to the electrode terminal 13. For example, the casing 11 and the cap plate 12 may have positive polarity, and the electrode terminal 13 may have negative polarity.

Each of the unit batteries 10 includes an upper surface, a lower surface, and four side surfaces. The upper surface may be a surface on which the cap plate 12 and the electrode terminal 13 are positioned, and the lower surface may be a surface on which a bottom 11a (see FIG. 5) of the casing 11 is positioned. That is, the electrode terminal 13 may be formed at an upper portion of the unit battery 10, and the bottom 11a of the casing 11 may be formed at a lower portion of the unit battery 10.

To correspond to the jelly roll shape of the electrode assembly, the four side surfaces of the unit battery 10 may include two first side surfaces 14a and 14b (see FIG. 4 regarding 14b) which are flat, and two second side surfaces 15a and 15b each of which has a predetermined curvature.

The multiple unit batteries 10 are positioned in parallel in the first direction (x direction), and specifically, the multiple unit batteries 10 are arranged such that the bottoms 11a of the casings 11 are positioned at the same side, and the electrode terminals 13 are positioned at the same side. In addition, the multiple unit batteries 10 are arranged such that the second side surfaces 15a and 15b are adjacent to one another.

The pair of connecting members 20 and 30 is attached to both sides of the multiple unit batteries 10 and electrically and physically connects the multiple unit batteries 10 in the first direction (x direction). The pair of connecting members 20 and 30 includes a first connecting member 20 which is fixed to the upper portions of the multiple unit batteries 10, and a second connecting member 30 which is fixed to the lower portions of the multiple unit batteries 10.

Figure 3:
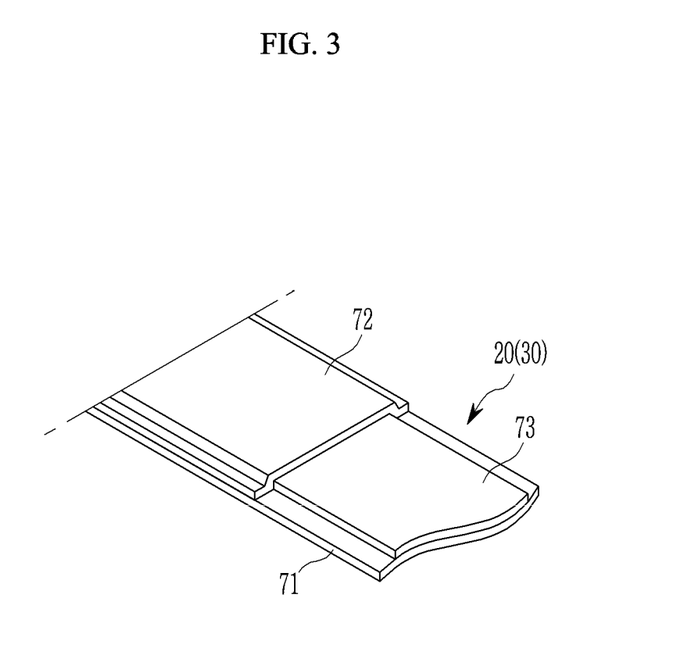
FIG. 3 is a partially cut-away perspective view of a first connecting member of the battery pack illustrated in FIG. 1.

FIG. 3 is a partially cut-away perspective view of the first connecting member of the battery pack illustrated in FIG. 1.

Referring to FIGS. 1 to 3, each of the first and second connecting members 20 and 30 has structured such that a metal wire 73 is inserted between a first insulating film 71 and a second insulating film 72 based on a cross-sectional shape of each of the first and second connecting members 20 and 30.

Each of the first and second insulating films 71 and 72 and the metal wire 73 between the first and second insulating films 71 and 72 is shaped to extend (elongate) with a predetermined width in a longitudinal direction of the first and second connecting members 20 and 30. Each of the first and second insulating films 71 and 72 may be a polyimide film, and the metal wire 73 may be a copper foil. The first and second connecting members 20 and 30 have excellent flexibility.

Each of the first and second connecting members 20 and 30 includes multiple battery fixing portions 21 or 31, at least one deformable portion 22 or 32, and one terminal portion 23 or 33 based on an external shape of each of the first and second connecting members 20 and 30. The deformable portion 22 or 32 is positioned between the two adjacent battery fixing portions 21 or 31, and the terminal portion 23 or 33 is positioned at one side of any one of the battery fixing portions 21 or 31.

In a case in which the battery pack 100 includes the two unit batteries 10, each of the first and second connecting members 20 and 30 includes the two battery fixing portions 21 and 31, the one deformable portion 22 or 32, and the one terminal portion 23 or 33. In each of the first and second connecting members 20 and 30, the battery fixing portion 21 or 31, the deformable portion 22 or 32, the battery fixing portion 21 or 31, and the terminal portion 23 or 33 are sequentially positioned in the longitudinal direction.

The multiple battery fixing portions 21 of the first connecting member 20 are electrically connected to the electrode terminals 13 and fixed to the upper surfaces of the unit batteries 10. The multiple battery fixing portions 31 of the second connecting member 30 are electrically connected to the bottoms 11a of the casings 11 and fixed to the lower surfaces of the unit batteries 10. The battery fixing portion 21 or 31 may be electrically connected to the electrode terminal 13 or the bottom 11a of the casing 11 by an anisotropic conductive film and integrally fixed to the electrode terminal 13 or the bottom 11a of the casing 11.

Figure 4:
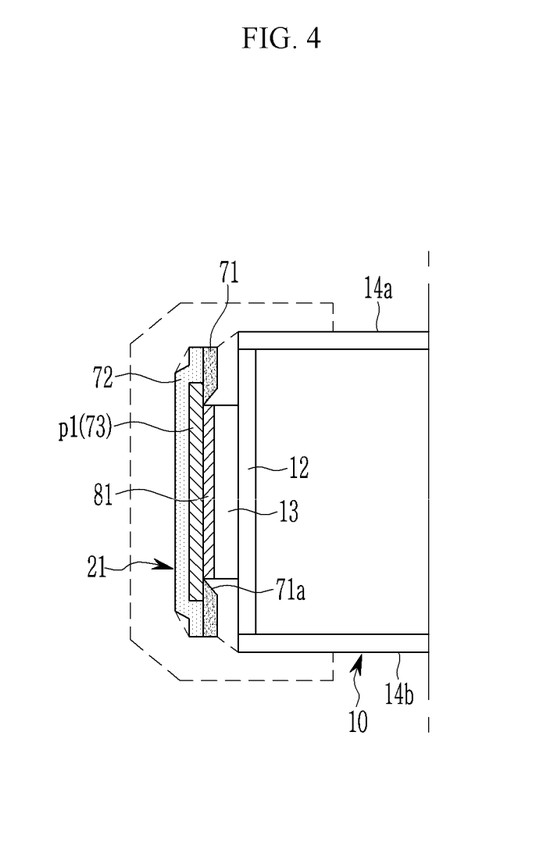
FIG. 4 is a partially cross-sectional view of the battery pack taken along line IV-IV in FIG. 1.

FIG. 4 is a partially cross-sectional view of the battery pack taken along line IV-IV in FIG. 1.

Referring to FIG. 4, on the battery fixing portion 21 of the first connecting member 20, an opening 71a is formed in the first insulating film 71 facing the unit battery 10 so that a part of the metal wire 73 is exposed. The opening 71a of the first insulating film 71 is formed at a position facing the electrode terminal 13, and the portion of the metal wire, which is exposed through the opening 71a, is a first pad p1.

A first anisotropic conductive film 81 may be positioned between the electrode terminal 13 and the first pad p1. The first anisotropic conductive film 81 is formed as a bonding layer into which multiple conductive balls are dispersed. When heat and pressure are applied to the first anisotropic conductive film 81 from the outside of the first connecting member 20, the multiple conductive balls come into contact with the electrode terminal 13 and the first pad p1 to electrically connect the electrode terminal 13 and the first pad p1, and the first pad p1 is attached to the electrode terminal 13 by the bonding layer.

Figure 5:
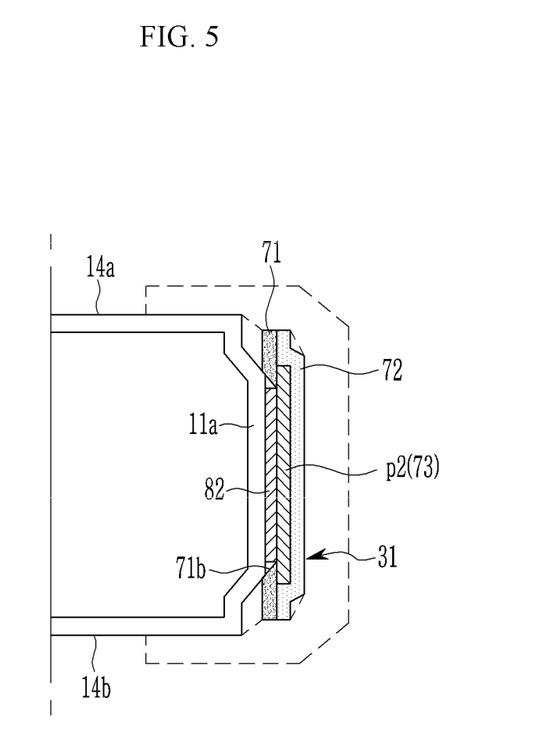
FIG. 5 is a partially cross-sectional view of the battery pack taken along line V-V in FIG. 1.

FIG. 5 is a partially cross-sectional view of the battery pack taken along line V-V in FIG. 1.

Referring to FIG. 5, on the battery fixing portion 31 of the second connecting member 30, an opening 71b is formed in the first insulating film 71 facing the unit battery 10 so that a part of the metal wire 73 is exposed. The portion of the metal wire 73, which is exposed through the opening 72b, is a second pad p2.

A second anisotropic conductive film 82 may be positioned between the bottom 11a of the casing 11 and the second pad p2. The second anisotropic conductive film 82 is formed as a bonding layer into which multiple conductive balls are dispersed. When heat and pressure are applied to the second anisotropic conductive film 82 from the outside of the second connecting member 30, the multiple conductive balls come into contact with the bottom 11a of the casing 11 and the second pad p2 to electrically connect the bottom 11a of the casing 11 and the second pad p2, and the second pad p2 is attached to the bottom 11a of the casing 11 by the bonding layer.

Referring back to FIGS. 1 and 2, the deformable portion 22 or 32 is bent at approximately 90° from the two adjacent battery fixing portions 21 or 31, and the deformable portion 22 or 32 is in contact with the side surfaces (any one of the first side surfaces 14a and 14b) of the unit batteries 10. Unlike the battery fixing portions 21 and 31, the deformable portions 22 and 32 are not attached to the unit battery 10.

That is, both sides of the deformable portion 22 or 32 are merely connected to the two battery fixing portions 21 or 31 but remain in a non-attached state to the unit battery 10.

Figure 6:
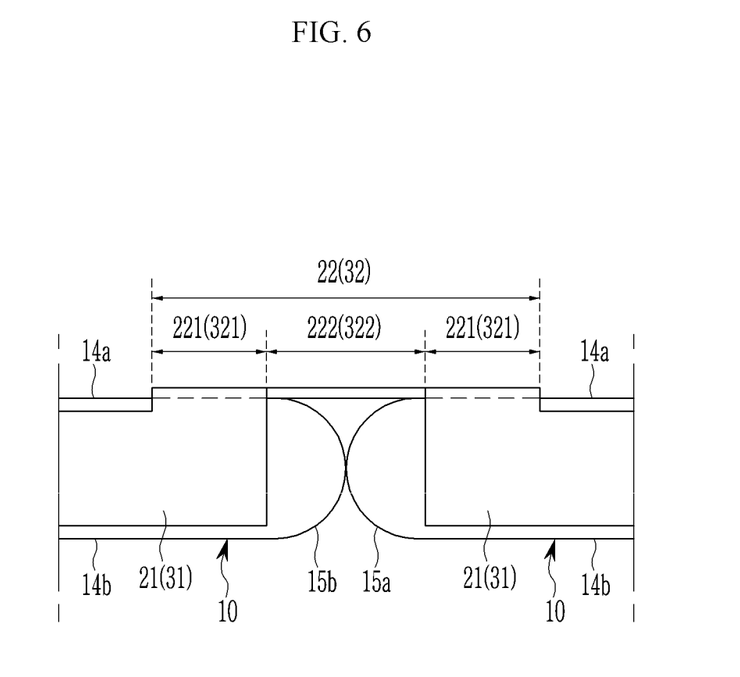
FIG. 6 is a partially front view of the battery pack illustrated in FIG. 1.

FIG. 6 is a partially front view of the battery pack illustrated in FIG. 1.

Referring to FIG. 6, the deformable portion 22 or 32 is positioned across the two adjacent unit batteries 10. The deformable portion 22 or 32 includes two contact portions 221 or 321 which are connected to the battery fixing portions 21 or 31 and are in contact with the first side surfaces 14a of the unit batteries 10, and a spacing portion 222 or 322 which is spaced apart from the second side surfaces 15a and 15b of the unit batteries 10. The spacing portion 222 or 322 is positioned between the two contact portions 221 or 321 and disposed to be spaced apart from the second side surfaces 15a and 15b.

As described above, a part of (spacing portion 222 or 322) of the deformable portion 22 or 32 remains in a non-contact state with the unit batteries 10, such that the spacing portion 222 or 322 is substantially bent by external force to enable the battery pack 100 to be deformed.

Referring back to FIGS. 1 and 2, the deformable portion 22 of the first connecting member 20 and the deformable portion 32 of the second connecting member 30 are positioned at the same side and face each other in a second direction (y direction) intersecting the first direction (x direction).

On each of the first and second connecting members 20 and 30, the terminal portion 23 or 33 is bent at approximately 90° at one side of any one battery fixing portion 21 or 31, such that the terminal portion 23 or 33 is positioned in parallel with the second side surface 15b of any one unit battery 10. The terminal portion 23 of the first connecting member 20 and the terminal portion 33 of the second connecting member 30 are positioned to be spaced apart from each other at a distance at the second side surface 15b of any one unit battery 10.

In this case, the support body 40 is positioned between the second side surface 15b of any one of the unit batteries 10 and the terminal portions 23 and 33, thereby providing a flat surface outside the second side surface 15b of the unit battery 10. The support body 40 has an approximately bar shape parallel to the second side surface 15b of the unit battery 10, and the support body 40 has a first concave groove 41 which is formed at one side facing the second side surface 15b and has the same curvature as the second side surface 15b, and a second concave groove 42 which is formed at a side (an outer side) opposite to the first concave groove 41 and has a rectangular shape.

Therefore, the support body 40 comes into close contact with an outer portion of the second side surface 15b of any one of the unit batteries 10, and the terminal portions 23 and 33 of the first and second connecting members 20 and 30 are accommodated in the second concave groove 42 of the support body 40. The protective circuit module 50 is positioned outside the terminal portions 23 and 33 of the first and second connecting members 20 and 30 and electrically connected to the terminal portions 23 and 33.

Figure 7:
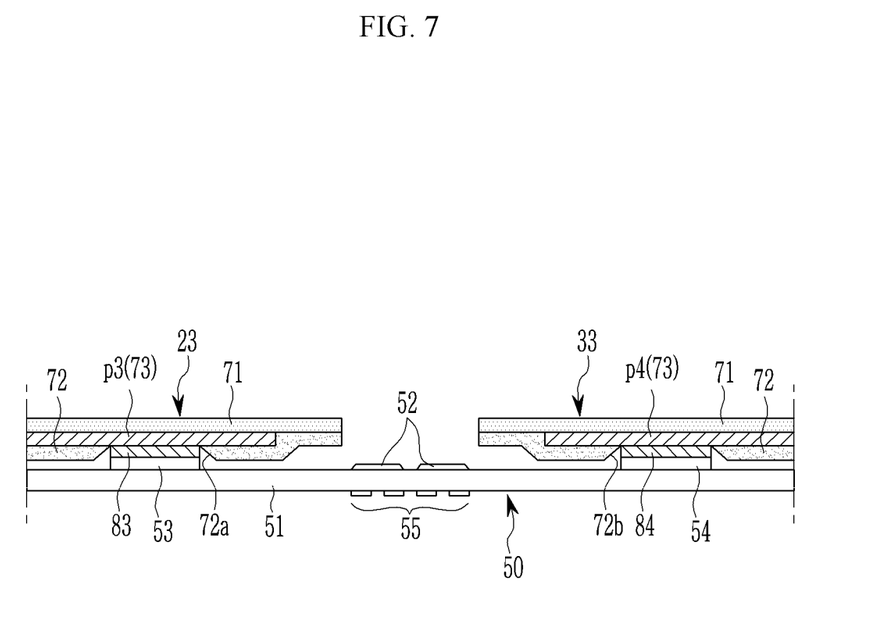
FIG. 7 is a cross-sectional view illustrating a state in which a terminal portion and a protective circuit module are coupled to each other in the battery pack illustrated in FIG. 2.

FIG. 7 is a cross-sectional view illustrating a state in which the terminal portion and the protective circuit module are coupled to each other in the battery pack illustrated in FIG. 2.

Referring to FIGS. 2 and 7, the protective circuit module 50 is electrically connected to the terminal portions 23 and 33, controls charge and discharge of the unit batteries 10, and serves to prevent overheating and explosion of the battery pack 100 caused by overcharge, overdischarge, or overcurrent.

The protective circuit module 50 may include a circuit board 51, protective elements 52 mounted on the circuit board 51, first and second inner terminals 53 and 54 formed on an inner surface of the circuit board 51, and outer terminals 55 formed on an outer surface of the circuit board 51.

The circuit board 51 is positioned in parallel with the second side surface 15b of any one of the unit batteries 10. The protective element 52 may be a passive element such as a resistor or a condenser or an active element such as an electric field transistor, and the protective element 52 may be mounted on the inner surface of the circuit board 51. The first inner terminal 53 is electrically connected to the terminal portion 23 of the first connecting member 20, and the second inner terminal 54 is electrically connected to the terminal portion 33 of the second connecting member 30. The first and second inner terminals 53 and 54 and the outer terminals 55 are electrically connected to the protective elements 52.

On the terminal portion 23 of the first connecting member 20, an opening 72a is formed in the second insulating film 72 facing the protective circuit module 50 so that a part of the metal wire 73 is exposed. The opening 72a of the second insulating film 72 is formed at a position facing the first inner terminal 53, and the portion of the metal wire 73, which is exposed through the opening 72a, is a third pad p3.

On the terminal portion 33 of the second connecting member 30, an opening 72b is formed in the second insulating film 72 facing the protective circuit module 50 so that a part of the metal wire 73 is exposed. The opening 72b of the second insulating film 72 is formed at a position facing the second inner terminal 54, and the portion of the metal wire 73, which is exposed through the opening 72b, is a fourth pad p4.

A third anisotropic conductive film 83 may be positioned between the first inner terminal 53 and the third pad p3, and a fourth anisotropic conductive film 84 may be positioned between the second inner terminal 54 and the fourth pad p4. The protective circuit module 50 may be electrically connected to the third and fourth pads p3 and p4 and integrally attached to the terminal portions 23 and 33 by the third and fourth anisotropic conductive films 83 and 84.

Referring back to FIGS. 1 and 2, the first and second connecting members 20 and 30 and the protective circuit module 50 may be more securely attached to the unit batteries 10 by the adhesive tapes 60. For example, one first adhesive tape 61 may be provided for each of the multiple battery fixing portions 21 and 31, and a second adhesive tape 62 may be provided outside the protective circuit module 50.

The first adhesive tape 61 covers a part of each of the battery fixing portions 21 and 31, and both ends of the first adhesive tape 61 are attached to the first side surfaces 14a and 14b of the unit battery 10, such that the battery fixing portions 21 and 31 are securely attached to the unit battery 10. The second adhesive tape 62 covers the protective circuit module 50, and both ends of the second adhesive tape 62 are attached to the first side surfaces 14a and 14b of the unit battery 10, such that the support body 40, the terminal portions 23 and 33, and the protective circuit module 50 are securely attached to the unit battery 10.

In this case, an opening, which exposes the outer terminal 55 of the protective circuit module 50, is formed in the second adhesive tape 62.

The battery pack 100 configured as described above is coupled to a flexible electronic device such as a bendable or foldable electronic device, and the battery pack 100 is deformed corresponding to a change in shape of the electronic device.

Figure 8:
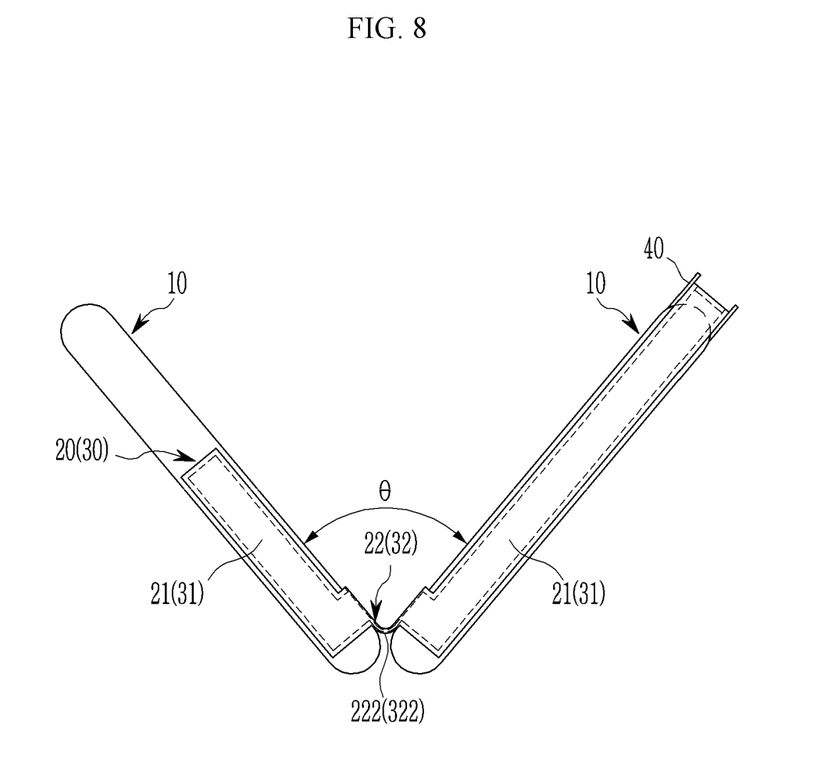
FIG. 8 is a front view illustrating a first modified example of the battery pack illustrated in FIG. 1.

FIG. 8 is a front view illustrating a first modified example of the battery pack illustrated in FIG. 1.

Referring to FIG. 8, the deformable portions 22 and 32 (specifically, the spacing portions 222 and 322) of the first and second connecting members 20 and 30 are bent by external force, such that the two unit batteries 10 are adjacent to each other at an angle θ smaller than 180°. The battery pack 100 may be deformed in a V shape, and the spacing portions 222 and 322 are bent at a larger curvature as an angle between the unit batteries 10 decreases.

Figure 9:
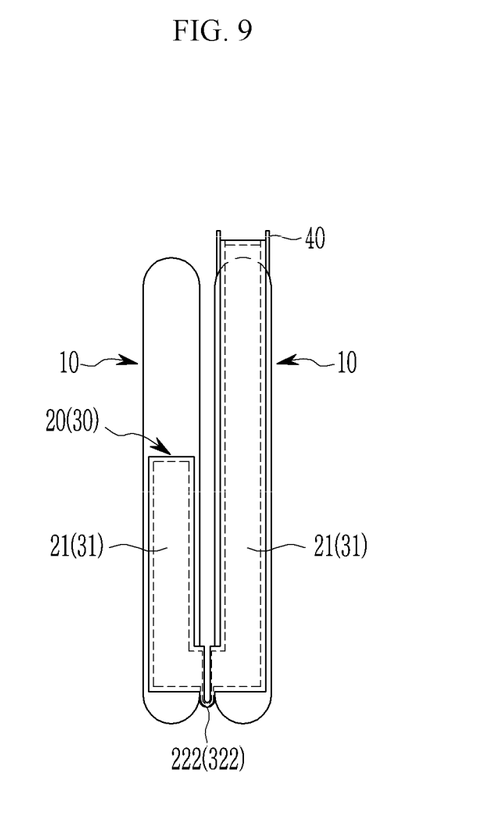
FIG. 9 is a front view illustrating a second modified example of the battery pack illustrated in FIG. 1.

FIG. 9 is a front view illustrating a second modified example of the battery pack illustrated in FIG. 1.

Referring to FIG. 9, the two unit batteries 10 may face each other, and in this case, the spacing portions 222 and 322 are bent at a maximum curvature.

As described above, the multiple unit batteries 10 of the battery pack 100 are electrically and physically connected to one another by using the first and second connecting members 20 and 30 made of a flexible material, and the battery pack 100 may be deformed in various forms as an angle between the unit batteries 10 is changed by bending the deformable portions 22 and 32 or as the unit batteries 10 face one another.

Meanwhile, FIGS. 1, 8, and 9 illustrate the battery pack 100 including the two unit batteries 10 as an example, but the number of unit batteries 10, which constitute the battery pack 100, is not limited to the illustrated example. In other words, three or more unit batteries may be collected to constitute the battery pack.

Figure 10:
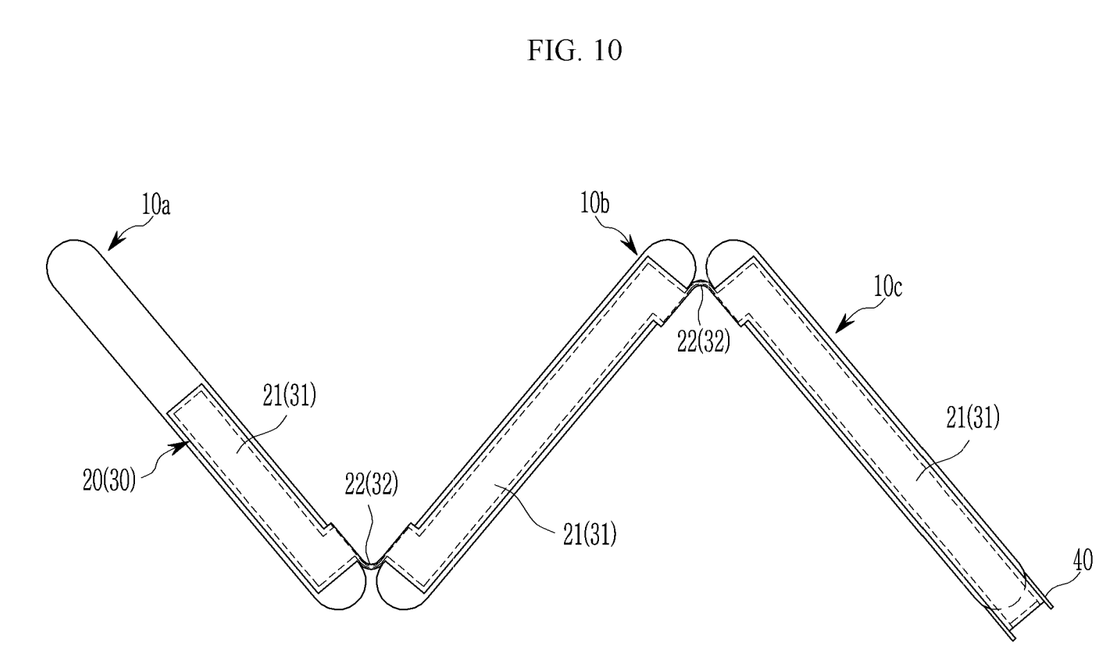
FIGS. 10 and 11 are front views illustrating a modified example of the battery pack which includes three unit batteries.
Figure 11:
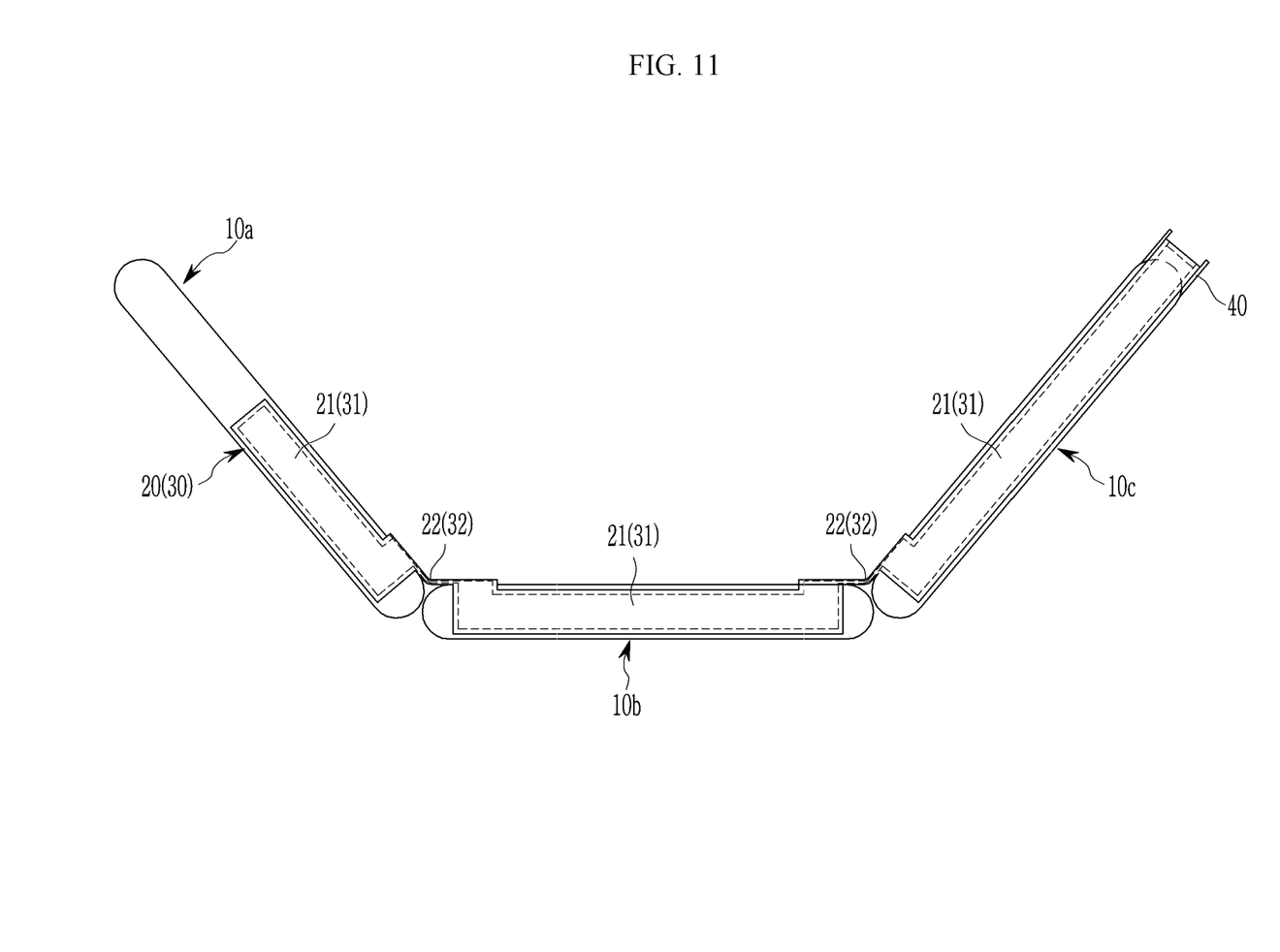

FIGS. 10 and 11 are front views illustrating a modified example of the battery pack which includes three unit batteries.

Referring to FIG. 10, the first and second unit batteries 10a and 10b may form an upwardly concave V shape, and the second and third unit batteries 10b and 10c may form a downwardly concave V shape. Although not illustrated, the first unit battery 10a may face one side of the second unit battery 10b, and the third unit battery 10c may face the other side of the second unit battery 10b.

Each of the first and second connecting members 20 and 30 includes three battery fixing portions 21 or 31, two deformable portions 22 or 32, and one terminal portion (not illustrated), and in this case, the two deformable portions 22 or 32 of each of the first and second connecting members 20 and 30 are positioned opposite to each other.

Referring to FIG. 11, the first and second unit batteries 10a and 10b may form an upwardly concave V shape, and the second and third unit batteries 10b and 10c may also form an upwardly concave V shape. Although not illustrated, the first unit battery 10a may overlap the second unit battery 10b, and the third unit battery 10c may overlap the first unit battery 10a.

Each of the first and second connecting members 20 and 30 includes three battery fixing portions 21 or 31, two deformable portions 22 or 32, and one terminal portion (not illustrated), and in this case, the two deformable portions 22 or 32 of each of the first and second connecting members 20 and 30 are positioned at the same side.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims.

<Description of symbols>

| | |
|---|---|
| 100: Battery pack | 10: Unit battery |
| 11: Casing | 12: Cap plate |
| 13: Electrode terminal | 14a, 14b: First side surface |
| 15a, 15b: Second side surface | 20: First connecting member |
| 30: Second connecting member | 21, 31: Battery fixing portion |
| 22, 32: Deformable portion | 23, 33: Terminal portion |
| 40: Support body | 50: Protective circuit module |
| 60: Adhesive tape | 71, 72: First and second insulating films |
| 73: Metal wire | |

The invention claimed is:

1. A battery pack comprising:
   multiple unit batteries which are positioned in parallel in a first direction; and
   a pair of connecting members attached to each of the multiple unit batteries such that the multiple unit batteries are between the pair of connecting members along a second direction, each of the pair of connecting members electrically and physically connecting the multiple unit batteries in the first direction,
   wherein each of the pair of connecting members includes:
   multiple battery fixing portions which are attached to the multiple unit batteries, respectively; and
   at least one deformable portion which is positioned between the multiple battery fixing portions such that at least a part of the deformable portion is in a non-contact state with the multiple unit batteries and the deformable portion is bent by external force, and
   wherein the part of the deformable portion in the non-contact state in its entirety is offset from the multiple battery fixing portions in the second direction.

2. The battery pack of claim 1, wherein:
   each of the pair of connecting members includes a metal wire, and first and second insulating films which surround the metal wire, and the pair of connecting members has flexibility.

3. The battery pack of claim 2, wherein:
   the metal wire and the first and second insulating films extend with a predetermined width in a longitudinal direction of the pair of connecting members.

4. The battery pack of claim 2, wherein:
   an opening is formed in any one of the first and second insulating films of each of the multiple battery fixing portions to expose a part of the metal wire, and
   the exposed part of the metal wire is electrically connected to a unit battery from among the multiple unit batteries and fixed to the unit battery.

5. The battery pack of claim 4, wherein:
   an anisotropic conductive film is positioned between the exposed part of the metal wire and the unit battery.

6. The battery pack of claim 4, wherein:
   each of the multiple unit batteries includes an upper surface, a lower surface, and multiple side surfaces, and
   the upper surfaces of the multiple unit batteries are positioned at the same side, the lower surfaces of the multiple unit batteries are positioned at the same side, and the side surfaces of the multiple unit batteries are arranged adjacent to one another.

7. A battery pack comprising:
   multiple unit batteries which are positioned in parallel in a first direction; and a pair of connecting members which is attached to both sides of the multiple unit batteries and electrically and physically connects the multiple unit batteries in the first direction, the pair of connecting members being spaced from each other along a second direction, wherein each of the pair of connecting members includes:

multiple battery fixing portions which are attached to the multiple unit batteries, respectively; and at least one deformable portion which is positioned between the multiple battery fixing portions such that at least a part of the deformable portion is in a non-contact state with the multiple unit batteries and the deformable portion is bent by external force, and wherein:

each of the pair of connecting members includes a metal wire, and first and second insulating films which surround the metal wire, and the pair of connecting members has flexibility, an opening is formed in any one of the first and second insulating films of each of the multiple battery fixing portions to expose a part of the metal wire, the exposed part of the metal wire is electrically connected to a unit battery from among the multiple unit batteries and fixed to the unit battery, each of the multiple unit batteries includes an upper surface, a lower surface, and multiple side surfaces, the upper surfaces of the multiple unit batteries are positioned at the same side, the lower surfaces of the multiple unit batteries are positioned at the same side, and the side surfaces of the multiple unit batteries are arranged adjacent to one another, the multiple battery fixing portions are in contact with the upper surfaces or the lower surfaces of the multiple unit batteries, the at least one deformable portion is bent from the multiple battery fixing portions and is in contact with the side surfaces of the multiple unit batteries, and the part of the deformable portion in the non-contact state in its entirety is offset from the multiple battery fixing portions in the second direction.

8. The battery pack of claim 7, wherein:

the multiple side surfaces include first side surfaces which are flat, and second side surfaces which have curvatures, the second side surfaces of the multiple unit batteries are arranged adjacent to one another, and the at least one deformable portion includes a spacing portion spaced apart from the second side surfaces.

9. The battery pack of claim 6, wherein:

each of the pair of connecting members includes a terminal portion which is connected to one side of any one of the multiple battery fixing portions and bent from the battery fixing portion, and the terminal portion is electrically connected to a protective circuit module.

10. A battery pack comprising:

multiple unit batteries which are arranged in a first direction so that side surfaces of the multiple unit batteries are adjacent to one another, and include electrode terminals formed on upper portions of the multiple unit batteries, and casing bottoms formed on lower portions of the multiple unit batteries;

a first connecting member which includes multiple first battery fixing portions that are fixed to the upper portions of the multiple unit batteries and electrically connected to the electrode terminals; and a second connecting member which includes multiple second battery fixing portions that are fixed to the lower portions of the multiple unit batteries and electrically connected to the casing bottoms, wherein:

the first and second connecting members are spaced from each other along a second direction and include at least one first deformable portion and at least one second deformable portion, respectively, the first and second deformable portions are bent from the multiple first and second battery fixing portions, respectively, and are in contact with the side surfaces of the multiple unit batteries, at least a part of the first deformable portion and at least a part of the second deformable portion are in a non-contact state with the multiple unit batteries, an angle between the multiple unit batteries is changed as the first and second deformable portions are bent, and the part of the first deformable portion in the non-contact state in its entirety is offset from the multiple first battery fixing portions in the second direction.

11. The battery pack of claim 10, wherein:

each of the multiple unit batteries includes two first side surfaces which are flat, and two second side surfaces which have curvatures, and the second side surfaces of the multiple unit batteries are arranged adjacent to one another.

12. The battery pack of claim 11, wherein: the first and second deformable portions include contact portions which are connected to the first and second battery fixing portions, respectively, and are in contact with the first side surface, and spacing portions which are spaced apart from the second side surface and bent.

13. The battery pack of claim 10, wherein:

each of the first and second connecting members includes a metal wire, and first and second insulating films which surround the metal wire.

14. The battery pack of claim 13, wherein:

an opening is formed in any one of the first and second insulating films of each of the multiple first and second battery fixing portions to expose a part of the metal wire, and the exposed part of the metal wire is electrically connected to the electrode terminal or the casing bottom by an anisotropic conductive film.

15. The battery pack of claim 13, wherein:

the first and second connecting members further include first and second terminal portions, respectively, which are connected to one side of any one of the multiple first and second battery fixing portions and are in parallel with the side surface of any one of the multiple unit batteries.

16. The battery pack of claim 15, further comprising:

a support body which is positioned between the side surface of any one of the unit batteries and the first and second terminal portions.

17. The battery pack of claim 16, wherein:

the support body has a first concave groove which is formed at an inner side directed toward the side surface of any one of the unit batteries, and a second concave groove which is formed at an outer side and has a rectangular shape, and the first and second terminal portions are accommodated in the second concave groove.

18. The battery pack of claim 15, further comprising:

a protective circuit module which is positioned outside the first and second terminal portions and electrically connected to the first and second terminal portions.

19. The battery pack of claim 18, wherein:
an opening is formed in any one of the first and second insulating films of each of the first and second terminal portions to expose a part of the metal wire, and
the exposed part of the metal wire is electrically connected to the protective circuit module by an anisotropic conductive film.

20. The battery pack of claim 18, further comprising:
first adhesive tapes which fix the first and second connecting members to the multiple unit batteries; and
a second adhesive tape which fixes the protective circuit module to any one of the unit batteries.

21. The battery pack of claim 7, wherein:
the metal wire and the first and second insulating films extend with a predetermined width in a longitudinal direction of the pair of connecting members.

22. The battery pack of claim 7, wherein:
an anisotropic conductive film is positioned between the exposed part of the metal wire and the unit battery.

* * * * *